Patented Dec. 14, 1948

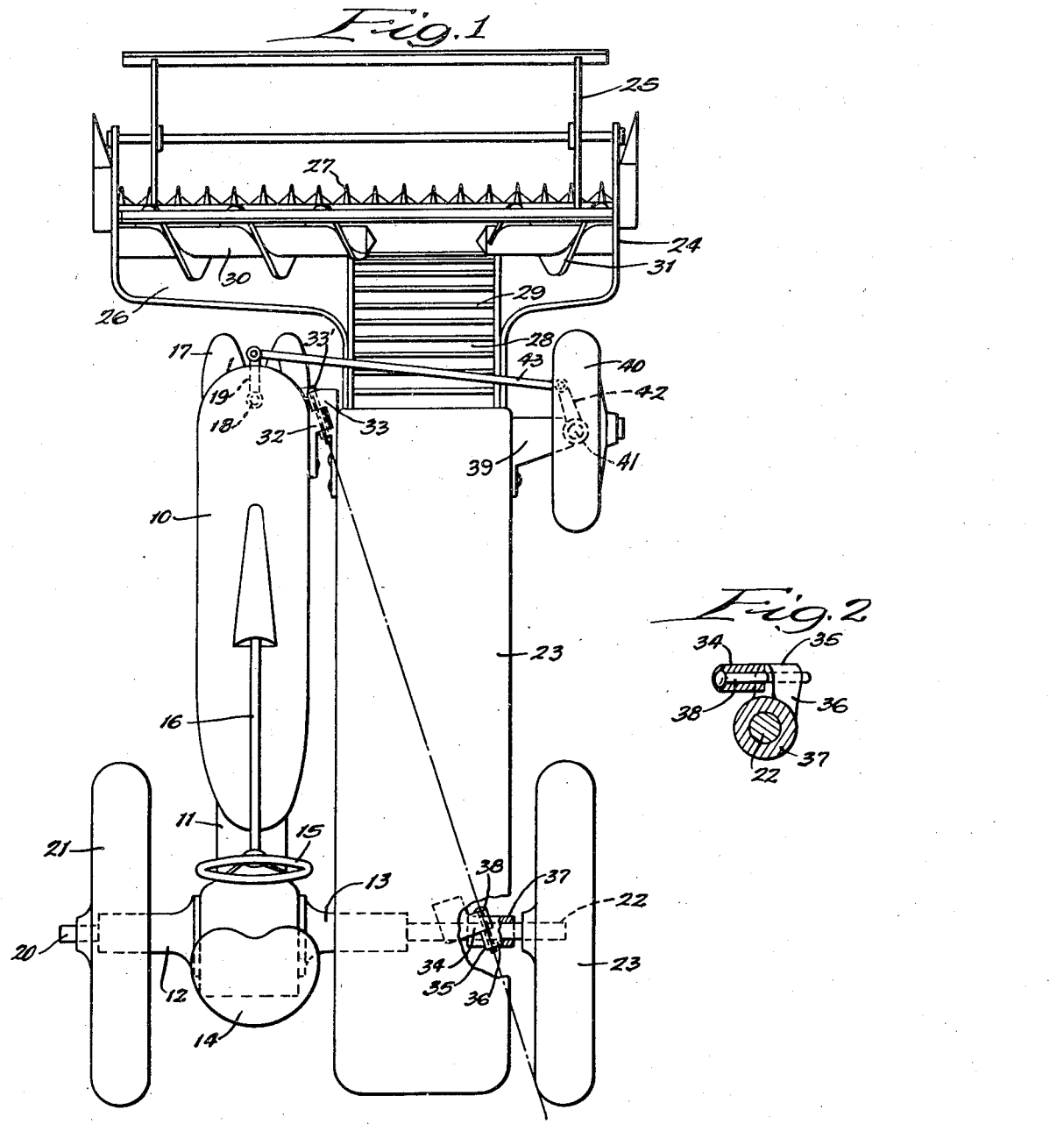

2,456,237

UNITED STATES PATENT OFFICE 2,456,237

TRACTOR MOUNTED IMPLEMENT

Russel D. Acton, Chicago, Ill., assignor to International Harvester Company, a corporation of New Jersey Application February 19, 1945, Serial No. 578,613

10 Claims. (Cl. 56—23)

This invention relates to tractor attached implements. More specifically it relates to floatingly and hingedly connecting an implement to a tractor.

In recent years the trend has been towards tractor-mounted implements. Some implements, such as harvester threshers, are so bulky and heavy that it is difficult to mount them directly on a tractor to be carried entirely thereby. It has therefore been proposed to support the implement partially on the tractor at two or more points, whereby the position of the implement is determined by steering the tractor. At the same time, a portion of a weight of the implement can be carried on a wheeled support.

A principal object of the present invention is to provide an improved mounting for an implement on a tractor of a conventional construction.

Another principal object is to provide two points of attachment of an unstable wheel supported implement with said points spaced longitudinally and laterally with respect to each other and arranged on a diagonal axis.

Another important object is to provide a steerable wheel in combination with a single axis mounting of an implement on a tractor.

The above objects and others which will be apparent from the detailed description to follow are attained by a construction such as shown in the drawing:

Figure 1 shows a plan view of a tractor with an implement attached thereto; and

Figure 2 is an enlarged sectional detail showing the connection between the harvester thresher and the rear axle of the tractor.

As this invention has to do with the mounting of an implement on a tractor, only such parts of the tractor and the implement have been shown in detail as are necessary to provide an adequate disclosure of the structural and functional parts of the mounting structure.

The drawing shows diagrammatically a tricycle tractor of an offset type. The tractor has a narrow longitudinally extending body portion 10, a longitudinally extending housing 11, and laterally extending rear axle housings 12 and 13. A seat 14 is also illustrated, as well as a steering wheel 15 which is mounted on a steering column 16 adapted to steer a front truck having closely spaced wheels 17 thereon. Said steerable front truck is provided with a vertical bolster indicated by the vertically projecting member 18 and a forwardly extending arm 19. Said arm is of the type provided on general purpose agricultural tractors for shifting cultivators and other equipment mounted at the front of the tractor with the steering of the front truck.

At the rear of the tractor, the axle housing 12 carries a live axle 20 on which a traction wheel 21 is mounted closely spaced to the body of the tractor. The axle housing 13 carries an extended live axle 22 on which a traction wheel 23 is mounted, widely spaced from the tractor body to provide a space for the positioning of implements having considerable width.

The implement illustrated is a harvester thresher consisting of two principal portions. A thresher part 23 is positioned alongside the body of the tractor extending substantially to the front end thereof and rearwardly beyond the rear axle housing 13. A harvester part 24 is mounted transversely at the front of the tractor being substantially coextensive in width with the tread of the traction wheels 21 and 23. The harvester part is of a conventional construction, some of the principal elements being illustrated. A rotatable reel 25 is shown mounted ahead and above a grain receiving platform 26. A conventional sickle-type cutter mechanism 27 is arranged along the front of the platform 26. From the platform, a conveyor supporting structure 28 extends upwardly to the thresher part 23. Said conveyor structure carries a conveyor 29. It will be noted that due to the offset construction of the tractor, the conveyor is also offset with respect to the platform 26. A long feed auger 30 is arranged at the tractor body side of the platform for delivering grain to the conveyor 29. A short auger 31 is arranged at the other side of the platform for delivering grain to the conveyor. The means of connecting the harvester part to the thresher part has not been illustrated, as it forms a part of the present invention only as illustrating an agricultural implement particularly adapted to be mounted at the side of an offset tractor and incorporating the novel hinging and supporting means of the invention.

Adjacent the front of the tractor body 10, a laterally extending bracket 32 is provided, being arranged adjacent a laterally projecting bracket 33 secured to the thresher part 23. The brackets 32 and 33 have alined openings through which a pivot pin 33' extends. Said pivot pin is arranged on a diagonal axis, as indicated by the dot-dash line, extending coaxially of the pin and diagonally of the outer end of the axle 22.

At its rear end, the thresher part 23 is provided with a bracket 34 arranged adjacent a bracket 35, carried on a bearing member 36 rotatably supported on a sleeve 37 which is secured to the axle 22 as illustrated in Figure 2. This supporting construction for carrying a substantial portion of the weight of the harvester thresher, adjacent the traction wheel 23, is a part of this invention only insofar as it functions in combination with the front mounting structure.

A pivot pin 38 extending through alined apertures in the brackets 34 and 35 is arranged coaxially with the pivot pin 33' to provide a diagonal hinge axis as indicated by the dot-dash line. By this means two laterally and longitudinally spaced connection points for an implement are provided on a tractor without the necessity of providing any special lost motion connections due to arcuate movements of one part with respect to another. This construction also makes possible the supporting of a considerable portion of a weight of an implement at the front of a tractor, and supporting another considerable portion of the implement's weight at the rear on a widely spaced traction wheel which is capable of carrying a large load, as very little of the tractor load of an offset tractor is carried on the widely spaced wheel.

At the front of the thresher part 23 a laterally extending bracket 39 provides means for attaching a wheel 40 on a conventional steerable spindle 41. Said spindle is provided with a steering arm 42 which is connected by a steering link 43 with the arm 19 on the steering column. This steering connection provides means for steering the wheel 40 along with the steerable front truck on which the wheels 17 are mounted. The operator, therefore, has accurate control of the front of the tractor implement combination for steering it accurately during operation.

As previously pointed out, the implement may hinge with respect to the tractor about the axis of the pins 33' and 38. The third point of support of the implement is on the steerable wheel 40. These three points provide a floating mounting for the implement hinged to the tractor and controllable thereby.

As previously pointed out with a harvester implement, as illustrated, a straight through machine is provided as the harvester portion of the machine is coextensive with the rear traction wheels 21 and 23. It is possible to use a standard tricycle tractor by merely moving one wheel in close and by spacing the other wheel to provide sufficient space for mounting the implement. Different implements may require different spacing of the wheels but the mounting and steering arrangement, as illustrated, could be used with a wide variety of implements.

It is to be understood that applicant has shown and described only one preferred embodiment of his invention and that he claims all modifications falling within the scope of the appended claims.

What is claimed is:

1. An implement attaching structure for tractors having a narrow longitudinally extending body, a narrow steerable support at the front of said body, an extended rear axle structure at one side of the tractor and a wheel on said structure spaced from the body to provide a space of substantial width for the positioning of implements and in combination therewith, an implement structure arranged alongside the tractor in said space, means for pivotally supporting said structure at opposite sides thereof at two longitudinally spaced points, one on the narrow body of the tractor at the front thereof and the other on the extended axle structure adjacent the wheel thereon, the axes of said pivotal supports being coaxially arranged on an axis extending rearwardly and outwardly from the front of the tractor to the rear, whereby the portion of the weight of the implement carried by the tractor is supported at the front substantially on the narrow steerable front support and at the rear adjacent the widely spaced wheel which carries a minimum portion of the tractor weight, and a supporting wheel mounted on said implement structure at the side opposite the tractor body.

2. An implement attaching structure for tractors having a narrow longitudinally extending body, a narrow steerable support at the front of said body, an extended rear axle structure at one side of the tractor and a wheel on said structure spaced from the body to provide a space of substantial width for the positioning of implements and in combination therewith, an implement structure arranged alongside the tractor in said space, means for pivotally supporting said structure at opposite sides thereof at two longitudinally spaced points, one on the narrow body of the tractor at the front thereof and the other on the extended axle structure adjacent the wheel thereon, the axes of said pivotal supports being coaxially arranged on an axis extending rearwardly and outwardly from the front of the tractor to the rear, whereby the portion of the weight of the implement carried by the tractor is supported at the front substantially on the narrow steerable front support and at the rear adjacent the widely spaced wheel which carries a minimum portion of the tractor weight, and a steerable supporting wheel mounted for limited movement about a vertical axis on said structure at the side opposite the front support on the tractor body.

3. An implement attaching structure for tractors having a narrow longitudinally extending body, a narrow steerable support at the front of said body and an extended rear axle structure at one side of the tractor and in combination therewith, an implement structure arranged alongside the tractor, means for pivotally supporting the front of said structure at one side thereof on the front portion of the tractor body, means for pivotally supporting the rear of said implement structure at the other side on the extended axle structure, the axes of said pivotal supports being coaxially arranged on an axis extending rearwardly and outwardly from the front of the tractor to the rear, whereby the portion of the weight of the implement carried by the tractor is supported at the front substantially on the narrow steerable front support and at the rear adjacent the widely spaced wheel which carries a minimum portion of the tractor weight, and a supporting wheel mounted on said implement structure at the side opposite the tractor body.

4. An implement attaching structure for tractors having a narrow longitudinally extending body, a narrow steerable support at the front of said body, an extended rear live drive axle at one side of the tractor and a wheel on said axle spaced from the tractor body to provide a space for mounting implements and in combination therewith, an implement structure arranged alongside the tractor and occupying said space, means for pivotally supporting the implement at one side on the front portion of the tractor body, a bearing structure on said live drive axle adjacent said wheel, means for pivotally supporting the rear of said implement structure at its other side on said bearing structure, the axes of said pivotal supports being coaxially arranged on an axis extending rearwardly and outwardly from the front of the tractor to the rear, whereby the portion of the weight of the implement carried by the tractor is supported at the front substantially on the narrow steerable front support and at the rear adjacent the widely spaced wheel which carries a minimum portion of the tractor weight, and a supporting wheel mounted on said implement structure at the side opposite the tractor body.

5. An implement attaching structure for tractors having a narrow longitudinally extending body, a narrow steerable front truck including a steering arm, an extended rear axle at one side of the tractor and a wheel on said axle spaced from the tractor body to provide a space for mounting implements and in combination therewith, an implement structure arranged alongside the tractor and occupying said space, means for pivotally supporting the implement at one side on the front of said structure at one side thereof on the front portion of the tractor body, means for pivotally supporting the rear of said implement structure at its other side on the extended axle structure, the axes of said pivotal supports being coaxially arranged on an axis extending rearwardly and outwardly from the front of the tractor to the rear, whereby the portion of the weight of the implement carried by the tractor is supported at the front substantially on the narrow steerable front support and at the rear adjacent the widely spaced wheel which carries a minimum portion of the tractor weight, a supporting wheel mounted for movement about a vertical axis on said structure at the side opposite the front support on the tractor body, and means connecting said wheel with the steering arm of the front truck.

6. An implement attaching structure for tractors having a narrow longitudinally extending body structure, a narrow front steerable support at the front of said body, an extended rear axle structure at one side of the tractor and a wheel spaced from the tractor body to provide a space for mounting implements and in combination therewith, an implement structure arranged alongside the tractor and occupying said space, bracket means on one side of said structure, bracket means extending laterally from the front portion of the tractor body, a hinge pin connecting said bracket means together, bracket means on the rear of said implement structure adjacent the wheel on the extended axle structure, bracket means extending from the axle structure, a hinge pin joining said last two bracket means together, said hinge pins being coaxially arranged on an axis extending rearwardly and outwardly from the front of the tractor to the rear, whereby the portion of the weight of the implement carried by the tractor is supported at the front substantially on the narrow steerable front support and at the rear adjacent the widely spaced wheel which carries a minimum portion of the tractor weight, bracket means extending outwardly from the front end of said structure, and a supporting wheel mounted for limited movement about a vertical axis on said bracket means.

7. An implement attaching structure for tractors having a narrow longitudinally extending body structure, a narrow front steerable support at the front of said body structure, a steerable lever arm extending from said steerable support, an extended rear axle structure at one side of the tractor and a wheel spaced from the tractor body to provide a space for mounting implements and in combination therewith, an implement structure arranged alongside the tractor and occupying said space, bracket means on one side of said structure, bracket means extending laterally from the front portion of the tractor body, a hinge pin connecting said bracket means together, bracket means on the rear of said implement structure adjacent the wheel on the extended axle structure, bracket means extending upwardly from the axle structure, a hinge pin joining said last two bracket means together, said hinge pins being coaxially arranged on an axis extending rearwardly and outwardly from the front of the tractor to the rear, whereby the portion of the weight of the implement carried by the tractor is supported at the front substantially on the narrow steerable front support and at the rear adjacent the widely spaced wheel which carries a minimum portion of the tractor weight, bracket means extending outwardly from the front end of said structure, a steerable wheel mounted on said bracket means, and steering connections between said wheel and the steering arm on the tractor.

8. An implement attaching structure for tractors having a narrow longitudinally extending body structure, a narrow front steerable support at the front of said body structure, an extended rear axle structure at one side of the tractor and a wheel mounted on said axle structure spaced from the body and in combination therewith, a harvester-thresher including a longitudinal thresher part arranged alongside the tractor and between the body and the wheel and a harvester part extending across the front of the tractor laterally to each side of the thresher part, bracket means extending toward the tractor from the front of the thresher part at the one side thereof, bracket means extending laterally from the front portion of the tractor body, hinge means connecting said bracket means together, bracket means on the rear of said thresher part at the other side thereof adjacent the wheel on the extended axle structure, bracket means extending upwardly from the axle structure, hinge means joining said last two mentioned bracket means together, said two hinge means being coaxially arranged on an axis extending rearwardly and outwardly from the front of the tractor to the rear, whereby the portion of the weight of the implement carried by the tractor is supported at the front substantially on the narrow steerable front support and at the rear adjacent the widely spaced wheel which carries a minimum portion of the tractor weight, and a supporting wheel mounted on said thresher part at the front thereof.

9. An implement attaching structure for tractors having a narrow longitudinally extending body structure, a narrow front steerable support at the front of said body, a steerable lever arm extending from said steerable support, an extended rear axle structure at one side of the tractor and a wheel mounted on said axle structure spaced from the body and in combination therewith, a harvester-thresher including a longitudinal thresher part arranged alongside the tractor and between the body and the wheel and a harvester part extending across the front of the tractor laterally to each side of the thresher part, bracket means extending toward the tractor from the front of the thresher part, bracket means extending laterally from the front portion of the tractor body, a hinge pin connecting said bracket means together, bracket means on the rear of said thresher part adjacent the extended axle structure, bracket means extending upwardly from the axle structure, a hinge pin joining said bracket means together, said hinge pins being coaxially arranged on an axis extending rearwardly and outwardly from the front of the tractor to the rear, whereby the portion of the weight of the implement carried by the tractor is supported at the front substantially on the narrow steerable front support and at the rear adjacent the widely spaced wheel which carries a minimum portion of the tractor weight, bracket means extending outwardly from the front end of said harvester part, a steerable wheel mounted on said bracket means spaced laterally from the thresher part and rearwardly from the harvester part, and steering connections between said wheel and the steering arm on the tractor.

10. An implement attaching structure for tractors having a narrow longitudinally extending body, a narrow steerable support at the front of said body, an extended rear axle structure at one side of the tractor and a wheel on said structure spaced from the body to provide a space of substantial width for the positioning of implements and in combination therewith, an implement structure arranged alongside the tractor in said space, means for pivotally supporting said structure at opposite sides thereof at two longitudinally spaced points, one on the narrow body of the tractor at the front thereof and the other on the extended axle structure, whereby the portion of the weight of the implement carried by the tractor is supported at its front substantially on the narrow steerable front support and at the rear adjacent the widely spaced wheel which carries a minimum portion of the tractor weight, and a supporting wheel mounted on said implement structure at the side opposite the tractor body.

RUSSEL D. ACTON.

REFERENCES CITED

The following references are of record in the file of this patent:

UNITED STATES PATENTS

| Number | Name | Date |
|---|---|---|
| 558,627 | Addington | Apr. 21, 1896 |
| 1,592,962 | Sample | July 20, 1926 |
| 1,699,251 | Ronning et al. | Jan. 15, 1929 |
| 1,755,524 | Stanfield | Apr. 22, 1930 |
| Re. 22,279 | Hyman et al. | Mar. 2, 1943 |
| 2,358,513 | Hyman | Sept. 19, 1944 |
| 2,363,897 | Paradise et al. | Nov. 28, 1944 |